US009427734B2

(12) United States Patent
Nielsen et al.

(10) Patent No.: US 9,427,734 B2
(45) Date of Patent: Aug. 30, 2016

(54) FLUID DISPENSER WITH LOW SURFACE ENERGY ORIFICE LAYER FOR PRECISE FLUID DISPENSING

(75) Inventors: Jeffrey A. Nielsen, Corvallis, OR (US); Jeremy Hartan Donaldson, Corvallis, OR (US); Benjamin Clark, Corvallis, OR (US); Debora J. Thomas, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1557 days.

(21) Appl. No.: 12/475,714

(22) Filed: Jun. 1, 2009

(65) Prior Publication Data

US 2010/0304496 A1 Dec. 2, 2010

(51) Int. Cl.
*G01N 31/16* (2006.01)
*B01L 3/02* (2006.01)

(52) U.S. Cl.
CPC .......... *B01L 3/0268* (2013.01); *B01L 2200/12* (2013.01); *B01L 2300/0829* (2013.01)

(58) Field of Classification Search
None
See application file for complete search history.

(56) References Cited

U.S. PATENT DOCUMENTS

| | | | | |
|---|---|---|---|---|
| 6,095,643 | A * | 8/2000 | Cook et al. | 347/87 |
| 7,540,599 | B2 * | 6/2009 | Droege et al. | 347/87 |
| 2002/0084290 | A1 * | 7/2002 | Materna | 222/420 |
| 2007/0084997 | A1 * | 4/2007 | Noritake et al. | 250/284 |

OTHER PUBLICATIONS

Burke, Cathie, The Inkjet printhead for Kodak easyshare aio printers, retrived from internet: http://pluggedin.kodak.com/post/?ID=488521.*

* cited by examiner

*Primary Examiner* — Robert Xu
(74) *Attorney, Agent, or Firm* — HR Inc. Patent Department

(57) ABSTRACT

The present invention is embodied in a method for precisely dispensing fluid, including treating an orifice of a fluid dispensing apparatus during a fabrication process by applying a low surface energy material layer onto the orifice, adjusting a thickness of the low surface energy material coating to a predetermined threshold and limiting backpressure of a low dead volume fluid delivery system coupled to the orifice to reduce interference or interruptions for precisely dispensing the fluid.

9 Claims, 5 Drawing Sheets

FLUID DISPENSER WITH LOW SURFACE ENERGY ORIFICE LAYER FOR PRECISE FLUID DISPENSING

BACKGROUND

The dispensing of volumes of solution onto or into fluid receptacles is employed in a wide range of industries and fields such as chemical research, pharmaceutical research titration, biological study and medical research and others. These industries and fields currently employ a number of dispensing methods, for example analog pipetting, acoustics and piezo technologies. The solutions are dispensed in fixed or varying quantities onto or into fluid receptacles, for example glass slides or lab chips or into receptacles, such as test tubes or well plates. Some of these existing technologies used are capable of dispensing volumes in the microliter or nanoliter range. Expensive serial dilution sequence processes are used in some existing technologies because of the large minimum volumes of the solution being dispensed.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of titration are described for illustrative purposes and the underlying dispensing technology can apply to any precision dispensing operations. In one embodiment of the present invention, clean, reliable and precise fluid dispensing is provided onto test surfaces or into test receptacles. In one embodiment, the fluid dispensing is used in a titration process for varying quantities of fluid to be dispensed. In another embodiment, a series of dispenses or a single dispense is provided for a specified quantity of fluid.

Figure 1:
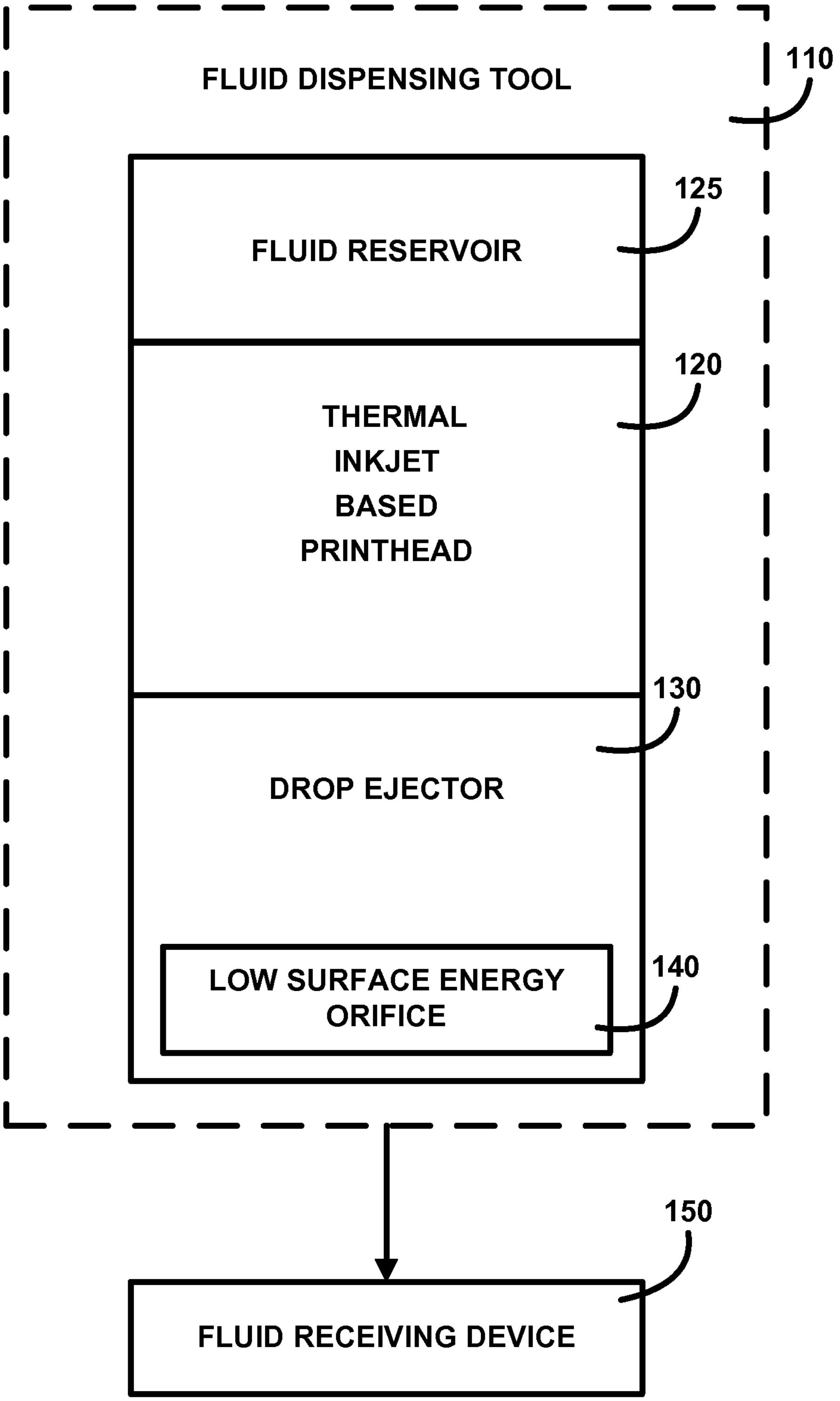
FIG. 1 shows a block diagram of an overview of the fluid dispenser with a low surface energy orifice layer for reliable precision dispensing in one embodiment of the present invention.

In general, FIG. 1 shows a block diagram of an overview of a low surface energy orifice layer for reliable precision dispensing method in one embodiment of the present invention. A fluid dispensing tool 110 includes a thermal inkjet based printhead 120. The thermal inkjet based printhead 120 is configured with a fluid reservoir 125 on a top area to hold a supply of fluid to be dispensed. The thermal inkjet based printhead 120 is configured with at least one drop ejector 130 or more on a bottom portion of the thermal inkjet based printhead 120. Each drop ejector 130 is configured with a low surface energy orifice 140 through which fluid is dispensed to a fluid receiving device 150 in one embodiment of the present invention.

In one embodiment, a new layer is added to the orifice of the drop ejector 130. The layer is made of low surface energy materials to create a low surface energy orifice 140, which limits fluid adhesion to surfaces of the low surface energy orifice 140. Fluid adhesion can cause drooling and pooling of the fluid as it is dispensed. Pooling refers to fluid that unintentionally accumulates on the printhead surface and covers the drop ejectors. Fluid pooling often encompasses the entire surface and affects trajectory, velocity, and drop shape. This can prevent drops from jetting, leading to no fluid being dispensed into a fluid receptacle, for example, a test well of a well plate. Well plates are plastic trays of many mini-test tubes.

The drop ejector 130 in one embodiment greatly reduces fluid pooling by using the low surface energy orifice 140, which precisely, efficiently, cost effectively and reliably dispenses clean drops of fluid with minimal drooling and pooling. As such, in one embodiment, the dispensing tool 110 is used for precision dispensing of small quantities of solution for titrating candidate test compounds.

Figure 2:
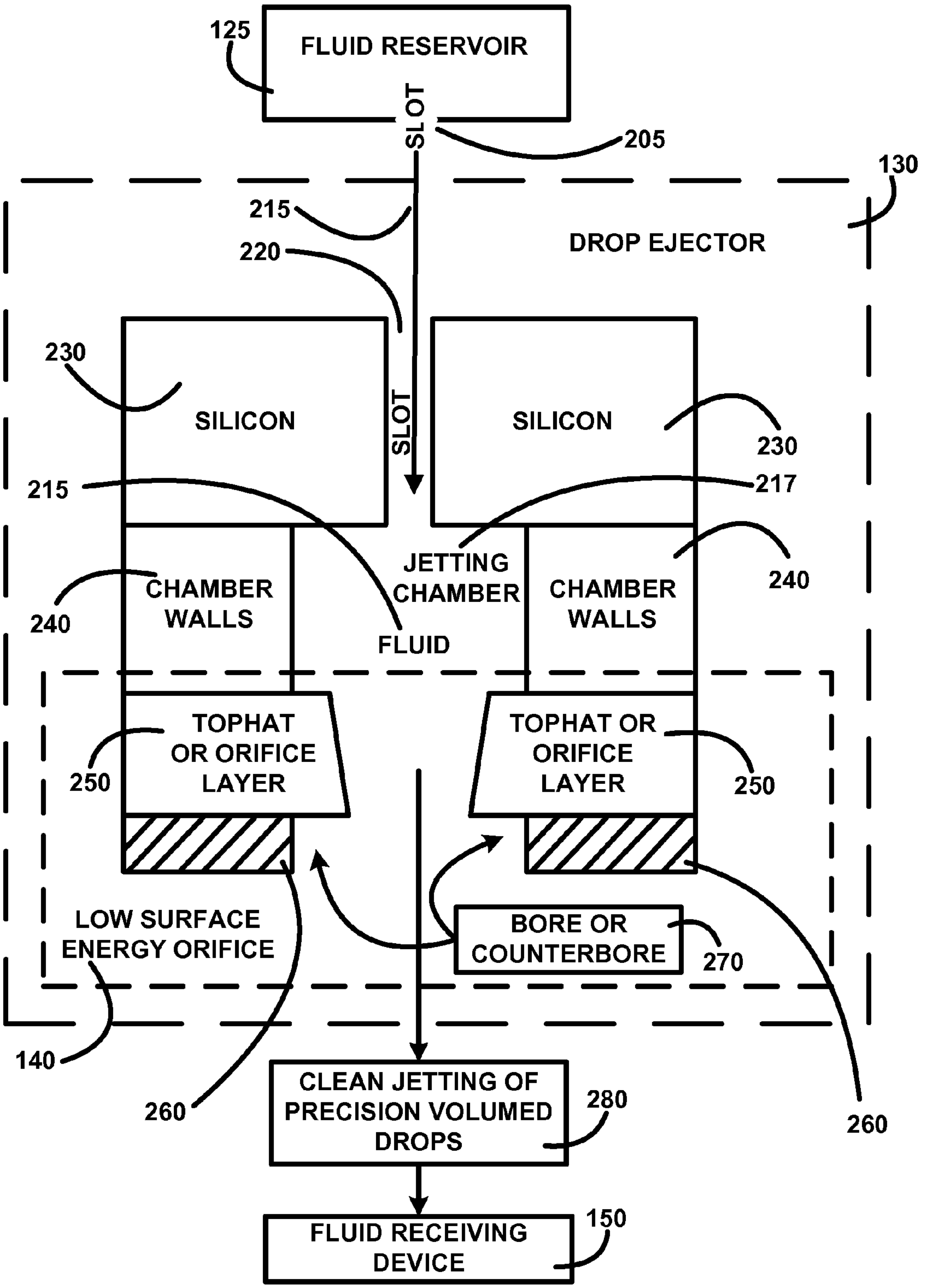
FIG. 2 shows an illustration of a structure of a reduced pooling low surface energy orifice layer drop ejector in one embodiment of the present invention.

Detailed Operation of the Low Surface Energy Layered Orifice:

FIG. 2 shows an illustration of a structure of the low surface energy orifice layer drop ejector in one embodiment of the present invention. A fluid supply from the fluid reservoir 125 provides at least one drop ejector 130 with a solution or a fluid for dispensing. The solution or fluid flows 215 through a slot 205 at the bottom of the fluid reservoir 125 and continues through a slot 220 extended through a printhead silicon structure and for example a silicon 230 base of the drop ejector, which is configured to reduce pooling. The fluid 215 accumulates in a jetting chamber 217. Adjacent to a top hat or orifice layer 250 are chamber walls 240 which form a portion of the drop ejector 130 body and form the jetting chamber 217 for fluid 215 before jetting. In one embodiment of the present invention, a low surface energy layer or coating 260 having low surface energy materials is spun onto the top hat or orifice layer 250. The low surface energy orifice coating 260 can be applied in varying thicknesses.

In addition, in one embodiment, the low surface energy orifice 140 can be configured with either a bore or counterbore 270. This is done by patterning the low surface energy orifice coating 260 when applied, for example, to be coincident with the top hat or orifice layer 250 edges (bore pattern) or non-coincident with the top hat or orifice layer 250 edges (counterbore pattern). The bore or counterbore 270 is formed to further reduce pooling and drooling of the fluid 215 during a clean jetting of precision volumed drops 280. Variations in the configuration of the drop ejector 130 can accommodate different types of fluid 215 for clean jetting of precision volumed drops 280 into or onto fluid receiving device 150 or receptacles in one embodiment of the present invention.

The reduced pooling drop ejector 130 with the low surface energy orifice 140 can be readily incorporated into for example standard printheads in mass quantities. In one embodiment, the present invention can be configured in a variety of thermal inkjet based precision dispensing printhead fluid delivery systems, making it feasible for use in numerous precision dispensing operations. The reduced pooling drop ejector 130 with the low surface energy orifice 140 can be adjusted to accommodate the various fluid 215 characteristics of different solutions in other embodiments of the present invention.

Figure 3:
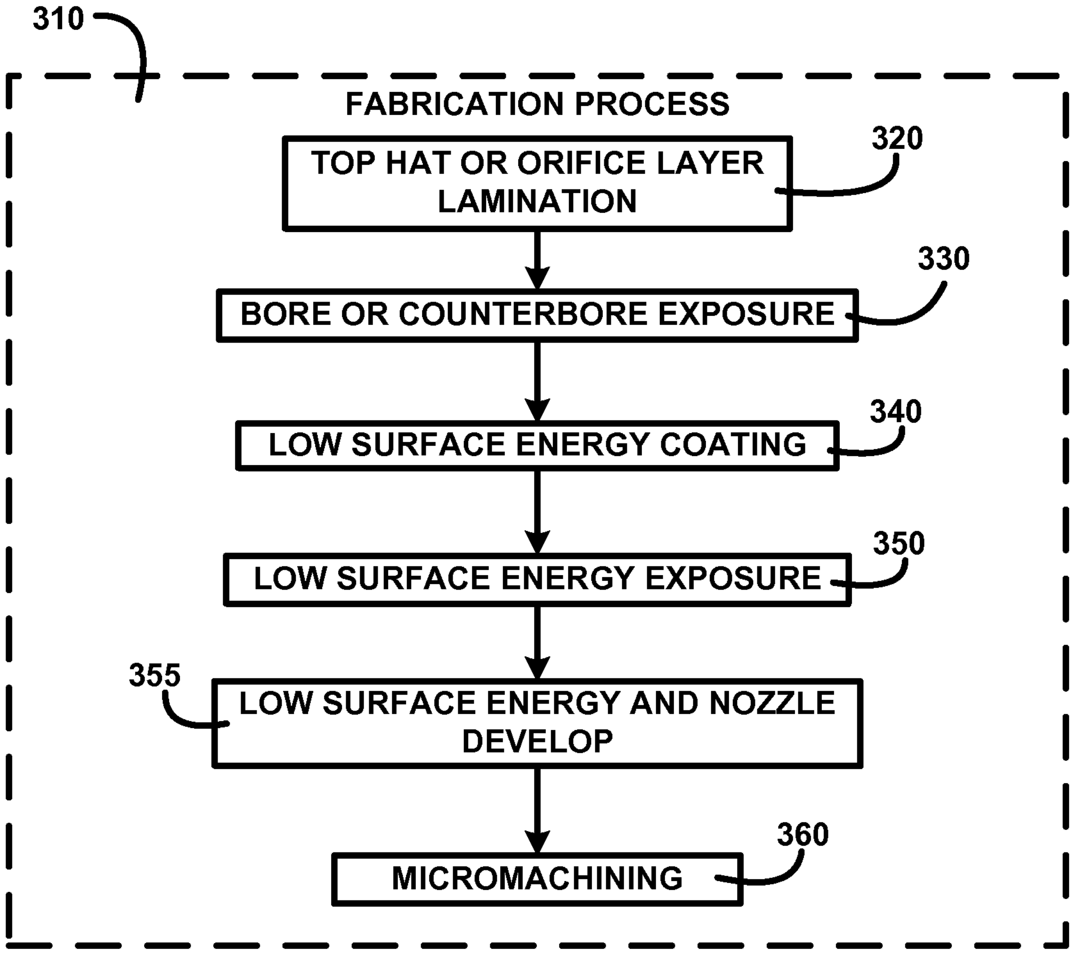
FIG. 3 shows a block diagram of an overview of a fabrication process of a low surface energy orifice layer in one embodiment of the present invention.

Fabrication Process:

FIG. 3 shows a block diagram of an overview of an exemplary fabrication process of a low surface energy orifice layer of one embodiment of the present invention. The fabrication process 310 includes the formation of a top hat 250 or orifice layer lamination (step 320), creation of a bore or counterbore (step 330) that can be incorporated into the tophat or orifice layer 250 of FIG. 2 prior to spinning the low surface energy coating (step 340) onto the top hat 250. In one embodiment, the bore or counterbore 270 of FIG. 2 can be varied from thin to thick for different fluids. Next, a low surface energy exposure (step 350) can be performed or the layers can be co-exposed in one embodiment of the present invention.

Applying the low surface energy coating of step 340 prior to when the low surface energy and nozzle develops (step 355), allows the pattern of the low surface energy coating 340 to be distinct from the nozzle layer, thereby providing additional design flexibility than if the layers are coincident in one embodiment of the present invention. The unexposed nozzle and low surface energy layers are developed in the same chemistry before fully curing and crosslinking the polymers. Micromachining (step 360) is then performed to remove any excess materials. In the fabrication process of FIG. 3, several other steps can be included, such as bake and oven cure steps, temporary protective coatings and other steps, which are not shown in FIG. 3 for brevity.

Figure 4:
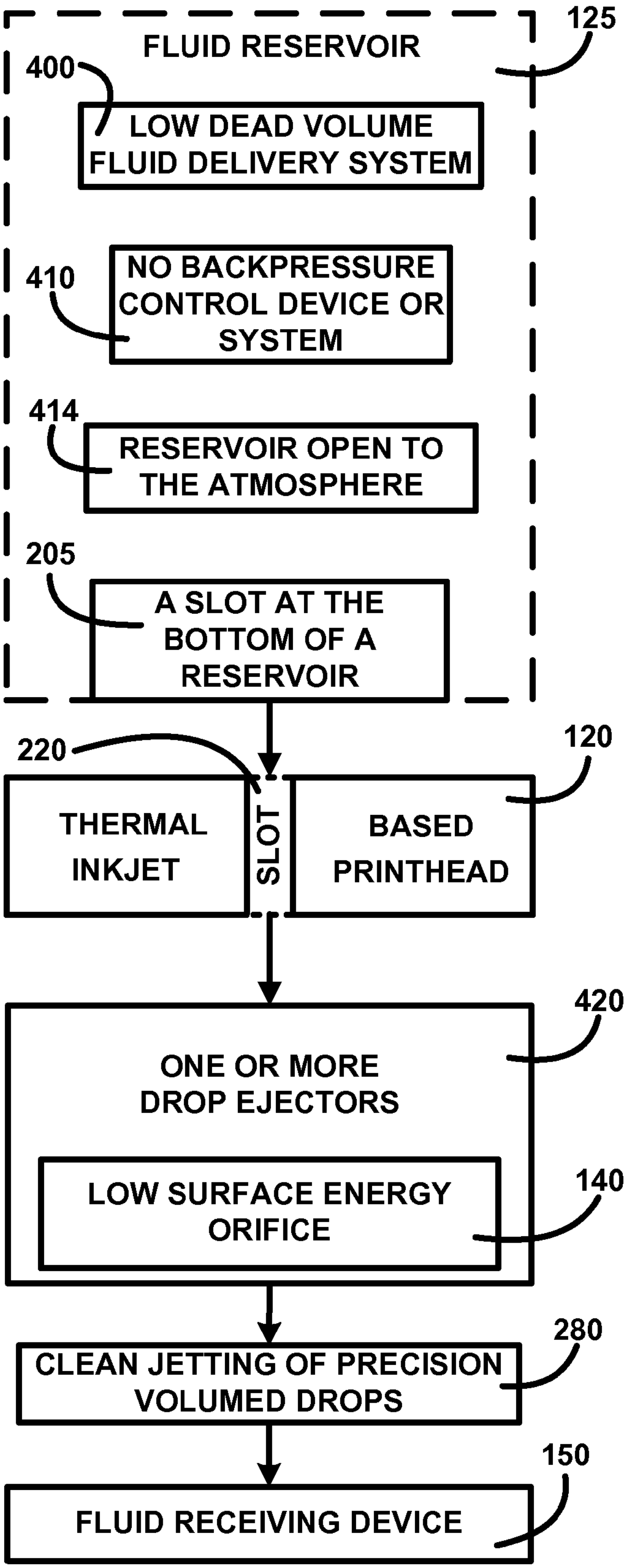
FIG. 4 shows a block diagram of a reduced pooling fast reliable disposable low surface energy orifice layer thermal inkjet based printhead in one embodiment of the present invention.

Low Surface Energy Orifice Layer Thermal Inkjet Based Printhead:

FIG. 4 shows a block diagram of a reduced pooling fast reliable disposable low surface energy orifice layer thermal inkjet based printhead in one embodiment of the present invention. The fluid dispensing tool 110 of FIG. 1 with the low surface energy orifice 140 layer thermal inkjet based printhead 120 reduces expense and increases efficiency by using a low dead volume fluid delivery system 400. In one embodiment, the low dead volume fluid delivery system 400 is a slot extender with no backpressure control device or system 410 placed on a top side of the printhead. Backpressure is negative pressure in the drop ejector 130 of FIG. 1 jetting chamber 217 of FIG. 2 to retard drooling and pooling. The low dead volume fluid delivery system 400 has no backpressure controlling device or system 410.

In one embodiment, a capillary mechanism inherent in the geometry between the drop ejector 130 of FIG. 1 and fluid reservoir 125 provides a predetermined reduced amount of backpressure at the orifice. The slot extender is a simple plastic reservoir that is used for a portion of the low dead volume fluid delivery system 400 in one embodiment. This acts as the fluid reservoir 125 to hold a large supply of a solution. In one embodiment, a reservoir open to the atmosphere 414 is easily filled, for example, with a pipette manually.

The solution, through a capillary motion, flows through a slot at the bottom of a reservoir 205 and the slot 220 in the printhead silicon base and the drop ejector 130 of FIG. 2 with the low surface energy orifice 140. The slot 220 allows solution to reach one or more drop ejectors 420 at the front of the printhead in one embodiment of the present invention.

The printhead can have a capacity for numerous reliable reduced pooling drop ejectors 130 of FIG. 1 with the low surface energy orifice 140 in one embodiment of the present invention. For example, in one embodiment, a thermal inkjet based printhead 120 can have 16 to 32 reduced pooling drop ejectors 130 of FIG. 1 with the low surface energy orifice 140. Other embodiments of the present invention can have different numbers and variations of the drop ejector 130 of FIG. 1 with the low surface energy orifice 140.

Efficiency, reliability, and speed are produced in the reduced pooling fast reliable low surface energy orifice layer thermal inkjet based printhead 120 through the use of one or more drop ejectors 420 with reduced pooling low surface energy orifice 140 layer which is placed on the bottom side of the printhead. In one embodiment, clean and precise volumed drops 280 of fluid are dispensed by the printhead 120. One or more precision volumed drops of solution can be jetted from one or more drop ejectors 420 onto or into a fluid receiving device 150, such as a test well in a well plate, a glass slide, lab chip or test tube in one embodiment of the present invention.

Reliability is created by the application of a low surface energy coating 260 of FIG. 2 to the orifice layer and dispensing surfaces. This limits fluid adhesion and thereby prevents pooling from forming, which limits dispensing failures that may be caused by fluid pooling in a cost effective manner. The reliability in the quality of dispensing is increased because fluid is dispensed with minimal drooling and pooling, which allows faster dispensing speeds in one embodiment of the present invention.

The low surface energy orifice 140 layer thermal inkjet based printhead 120 also is a cost effective method for using thermal inkjet based dispensing of solution in smaller quantities. This allows a dispensing operation that is faster with higher jetting frequencies, so larger numbers of drop ejectors 130 of FIG. 1 can be used for large solution fill capacities in one embodiment.

Figure 5A:
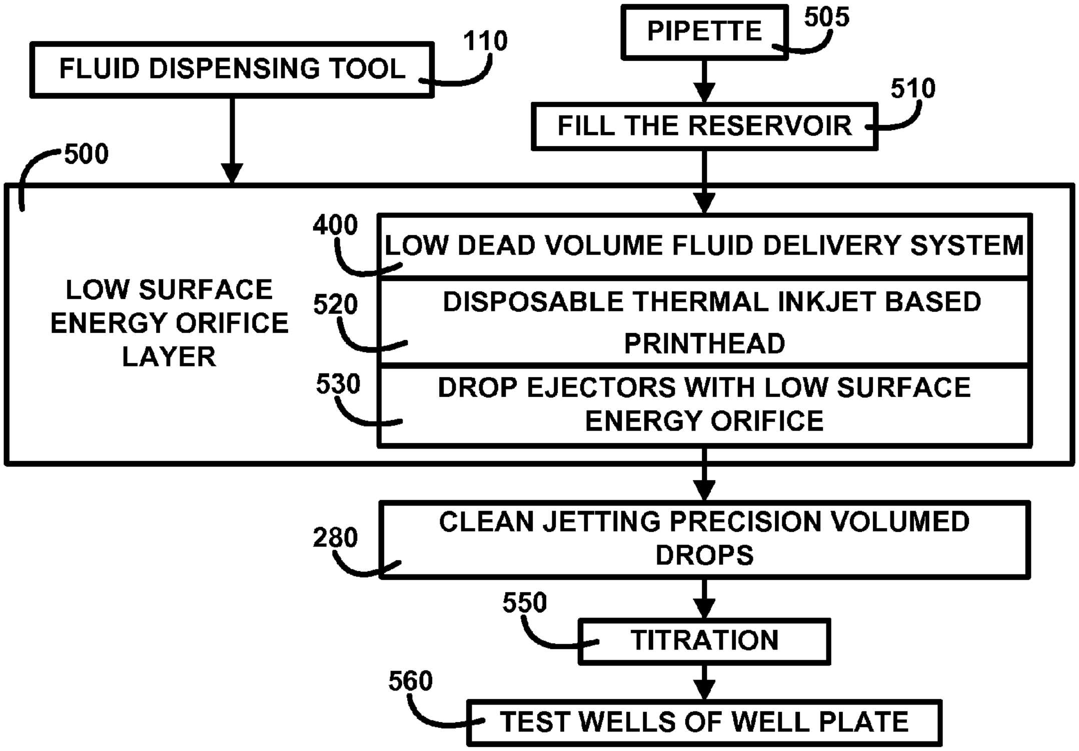
FIG. 5A shows a block diagram of a low surface energy orifice layer in thermal inkjet based precision dispensing system operation for a titration process in one embodiment of the present invention.
Figure 5B:
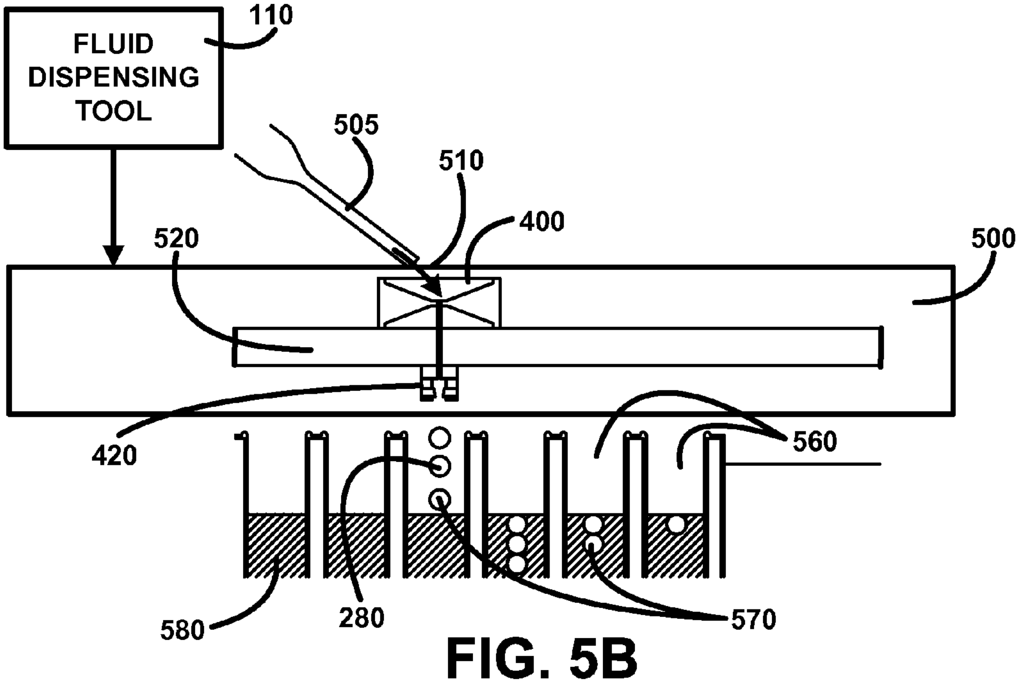
FIG. 5B shows an illustration of a low surface energy orifice layer in thermal inkjet based precision dispensing system operation for a titration process in one embodiment of the present invention.

Precision Dispensing Operation:

FIG. 5A shows a block diagram of a low surface energy orifice layer in thermal inkjet based precision dispensing system operation for a titration process in one embodiment of the present invention. FIG. 5A and FIG. 5B illustrate an operation of a fluid dispensing tool 110 of FIG. 1 configured with a low surface energy orifice layer 500 in a thermal inkjet based precision dispensing system.

An example of a precision dispensing operation using the low surface energy orifice layer fast reliable precision fluid dispensing is a titration 550 process for screening candidate drug compounds. Titration 550 is used in a number of fields and with various dispensing technologies. An example where titration 550 is used extensively is in pharmaceutical drug research in the drug discovery process which uses titration 550 in screening to test very small samples of drug compound concentrations to discover the level needed to effectively attack a target such as a virus.

The titration 550 process generally employs a method, such as pipetting, to dispense small quantities of various classes of fluids in measured concentrations of the dissolved substance into small receptacle test wells, such as test tubes, which contain a known volume of the test solution. The small receptacle test wells could contain a prior loaded test solution containing for example a buffer, media, markers, enzymes, or cells or other chosen fluid. In this example for illustrative purposes only is a solution of a candidate drug compound 570 (dissolved substance), virus in a solution 580 (test solution) and test wells of well plate 560 (small receptacle test wells). In one embodiment, fluid pooling is reduced, which allows faster speed of reliable dispensing. This faster speed of reliable dispensing benefits high volume titration 550 operations.

The low surface energy orifice layer 500 varies the amount of the solution of a candidate drug compound 570 being dispensed by clean jetting of precision volumed drops 280 of a highly concentrated solution of a candidate drug compound 570. The quantity dispensed is from one or more drop ejectors 530 delivering varying numbers of precision volumed drops of a highly concentrated candidate drug compound solution. The quantities dispensed determine the concentration and since the drops are for example picoliter volumed, the range of concentrations delivered can be extensive.

In one embodiment, a quantity of highly concentrated solution of a candidate drug compound 570 is conveyed using a pipette 505 to fill the reservoir 510. The tip of the pipette 505 is shown in FIG. 5B in the operation to fill the reservoir 510 with a quantity of highly concentrated solution of a candidate drug compound 570. The fluid reservoir 125 of FIG. 1 is the slot extender portion of the low dead volume fluid delivery system 400. Thusly the highly concentrated solution of a candidate drug compound 570 is loaded into the low dead volume fluid delivery system 400 and flows through a disposable thermal inkjet based printhead 520 to each of the drop ejectors with low surface energy orifice 530.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A fluid dispensing device for dispensing fluid with reduced pooling, comprising:

a thermal inkjet printhead comprising at least one drop ejector, each said drop ejector comprising a base, a jetting chamber and an orifice including a low surface energy layer; and a fluid delivery system comprising:

a fluid reservoir which is open to the atmosphere and positioned above said at least one drop ejector, wherein said fluid delivery system does not comprise a backpressure control device.

2. The fluid dispensing device of claim 1, comprising a plurality of said drop ejectors with respective low surface energy orifice layers for independently ejecting precise volumed drops of fluid.

3. The fluid dispensing device of claim 1, wherein the reservoir fluid receptacle is configured to manually receive fluid from a pipette.

4. The fluid dispensing device of claim 1, wherein said orifice comprises a top hat and the low energy orifice layer is deposited on the top hat.

5. The fluid dispensing device of claim 1, further comprising a test receptacle configured to receive a predetermined picoliter amount of volumed drops from the low surface energy orifice layer.

6. The fluid dispensing device of claim 4, wherein said top hat and said low energy orifice layer have respective edges defining respective bores, wherein the bore of the low energy orifice layer is coincident with the bore of the top hat.

7. The fluid dispensing device of claim 4, wherein said top hat and said low energy orifice layer have respective edges defining respective bores, wherein the edge of the low energy orifice layer is non-coincident with the bore of the top hat.

8. A fluid dispensing device for dispensing fluid, comprising:

a thermal inkjet printhead comprising a drop ejector, wherein the drop ejector comprises a base, a jetting chamber and an orifice including a low surface energy layer; and a fluid delivery system comprising:

a fluid reservoir, wherein the reservoir is to be open to the atmosphere and positioned above said drop ejector, and wherein said reservoir does not comprise a backpressure control device; and a slot extender that reduces backpressure at said drop ejector.

9. A fluid dispensing device for dispensing fluid, comprising:

a thermal inkjet printhead comprising plural drop ejectors, each drop ejector comprising a base, a jetting chamber, and an orifice including a low surface energy layer; and a fluid delivery system comprising:

a fluid reservoir which is to be open to the atmosphere and positioned above each drop ejector; and a slot extender comprising a first slot and a second slot, wherein said extender is positioned between said fluid reservoir, and said drop ejectors, wherein said slot extender reduces backpressure at each drop ejector, and wherein said fluid delivery system does not comprise a backpressure control device.

* * * * *